(12) United States Patent
Mahmoud et al.

(10) Patent No.: US 12,332,408 B2
(45) Date of Patent: Jun. 17, 2025

(54) ANTI-REFLECTIVE OPTICAL STRUCTURES FOR OPTICAL SYSTEMS

(71) Applicant: Apple Inc., Cupertino, CA (US)

(72) Inventors: Mohamed Mahmoud, Sunnyvale, CA (US); Huiyang Deng, San Jose, CA (US); Satyarth Suri, San Jose, CA (US); Jason S. Pelc, Sunnyvale, CA (US); Peter L. Chang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 275 days.

(21) Appl. No.: 18/119,591

(22) Filed: Mar. 9, 2023

(65) Prior Publication Data

US 2024/0069248 A1 Feb. 29, 2024

Related U.S. Application Data

(60) Provisional application No. 63/400,254, filed on Aug. 23, 2022.

(51) Int. Cl.
| | | |
|---|---|---|
| *G02B 1/118* | (2015.01) | |
| *G02B 1/02* | (2006.01) | |
| *G02B 6/12* | (2006.01) | |
| *G02B 6/122* | (2006.01) | |

(52) U.S. Cl.
CPC ............... *G02B 1/118* (2013.01); *G02B 1/02* (2013.01); *G02B 6/122* (2013.01); *G02B 2006/12038* (2013.01); *G02B 2006/12061* (2013.01)

(58) Field of Classification Search
CPC .......... G02B 1/118; G02B 1/02; G02B 6/122; G02B 2006/12038; G02B 2006/12061; G02B 2006/12107; G02B 6/124; G02B 6/34

See application file for complete search history.

(56) References Cited

U.S. PATENT DOCUMENTS

| | | | |
|---|---|---|---|
| 6,897,469 B2 * | 5/2005 | Syllaios | G02B 1/118 257/680 |
| 11,662,584 B2 * | 5/2023 | Lee | G02B 27/0172 359/630 |
| 2011/0242662 A1 | 10/2011 | Momoki et al. | |
| 2012/0081909 A1 | 4/2012 | Nishida et al. | |
| 2019/0196063 A1 | 6/2019 | Gui et al. | |

(Continued)

FOREIGN PATENT DOCUMENTS

JP 2007071917 3/2007

OTHER PUBLICATIONS

Chen et al., "Biomimetic nanostructured antireflection coating and its application on crystalline silicon solar cells," *Optics Express*, vol. 19, No. 15, 2011, pp. 14411-14419.

(Continued)

*Primary Examiner* — John Bedtelyon
(74) *Attorney, Agent, or Firm* — Brownstein Hyatt Farber Schreck, LLP

(57) ABSTRACT

Anti-reflective optical structures are disclosed. The anti-reflective optical structures include sub-wavelength structures in order to produce one or more index of refraction gradients within the anti-reflective optical structures. The one or more index of refraction gradients can reduce reflection of light over a broad band of wavelengths.

20 Claims, 8 Drawing Sheets

(56) References Cited

U.S. PATENT DOCUMENTS

2019/0271799 A1  9/2019  Sosnowski et al.

OTHER PUBLICATIONS

Chattopadhyay et al., "Anti-reflecting and photonic nanostructures," *Materials Science and Engineering R 69*, 2010, pp. 1-35.
Raguin et al., "Subwavelength Structured Surfaces and their Applications," Conference on Binary Optics, An Opportunity for Technical Exchange, 1993, 13 pages.

* cited by examiner

ANTI-REFLECTIVE OPTICAL STRUCTURES FOR OPTICAL SYSTEMS

CROSS-REFERENCE TO RELATED APPLICATION(S)

This application is a nonprovisional patent application of and claims the benefit of U.S. Provisional Patent Application No. 63/400,254, filed Aug. 23, 2022, and titled "Anti-Reflective Optical Structures for Optical Systems," the disclosure of which is hereby incorporated herein by reference in its entirety.

FIELD

The described embodiments relate generally to anti-reflective optical structures. More particularly, the present embodiments relate to anti-reflective optical structures that include sub-wavelength surface features, as well as photonic integrated circuits and optical systems that include these anti-reflective optical structures.

BACKGROUND

Optical systems are used to transmit light for any of a wide variety of purposes. When light travels from an optical component to an emergent medium having a different refractive index, some of that light may reflect off the interface between the optical component and the emergent medium. Some conventional anti-reflective coatings may be used to reduce the amount of back-reflection.

SUMMARY

The present disclosure relates to anti-reflective optical structures. The anti-reflective optical structures can be used to limit reflection of light from transmission surfaces of optical components. For example, an anti-reflective optical structure as described herein can reduce back reflection of light exiting the optical component and entering a medium having a lower refractive index. In some cases, the optical component is a waveguide, and the transmission surface may be defined by the waveguide core.

An anti-reflective optical structure as described herein can reduce back-reflection from a transmission surface over a broad range of wavelengths, such as a range of at least 500 nm. In some cases, the anti-reflective effect may be obtained over a wavelength range of 1000 nm. As an example, the amount of back-reflection for a given wavelength of light may be no greater than −25 dB over a target wavelength range (e.g., an averaged amount of back-reflection over the target wavelength range).

The anti-reflective optical structure may be partially defined by surface features along the transmission surface of the optical component. In some cases, the transmission surface defines a set of sub-wavelength surface features. The set of sub-wavelength surface features may define a sub-wavelength grating or another sub-wavelength structure along the transmission surface. In some examples, the set of sub-wavelength surface features may have a dimension and/or a spacing that is less than one micrometer to facilitate use of the anti-reflective optical structure for infrared light.

The optical structure may also be partly defined by a coating disposed over the surface features along the transmission surface. In some cases, the coating is a multi-layer coating and an innermost layer of the multi-layer coating is disposed onto at least a portion of these surface features. For example, when the transmission surface defines a first set of grooves, an innermost layer of the multi-layer coating may extend into the grooves and along the groove walls. An outermost layer of the multi-layer coating may be disposed over the first coating, may define an interface with the emergent medium (e.g., air or another optical component), and may define a second set of surface features. The second set of surface features may be a second set of sub-wavelength surface features that defines a sub-wavelength grating or another sub-wavelength structure. In some examples, the second set of sub-wavelength surface features may have a dimension and/or a spacing that is less than 1 micrometer to facilitate use of the anti-reflective optical structure for infrared light.

An anti-reflective optical structure as described herein may include a refractive index gradient. In some cases, the anti-reflective optical structure defines multiple refractive index gradients. For example, each of the first set of sub-wavelength surface features and the second set of sub-wavelength surface features may define a refractive index gradient that decreases in an outward direction, as described in more detail below. The first set of sub-wavelength surface features in combination with the first layer of the multi-layer coating may also define a refractive index gradient. The anti-reflective optical structure may therefore provide a transition between the refractive index of the optical component and a refractive index of the emergent medium or one of the layers of the coating.

The materials used to form the layers of the multi-layer coating may be selected to produce the desired refractive index gradient(s). For example, the first layer of the multi-layer coating may be formed from a material that has a refractive index less than a refractive index of the material defining the transmission surface of the optical component. The second layer of the multi-layer coating may be formed from a material that has a refractive index less than a refractive index of the material defining the transmission surface and greater than a refractive index of the material forming the first layer.

The present disclosure also relates to photonic integrated circuits and optical systems including anti-reflective optical structures. For example, the photonic integrated circuit may include a light-transmissive optical component that defines the first set of sub-wavelength surface features and a multilayer coating that is disposed over the first set of sub-wavelength surface features. As previously described, an outermost layer of the coating may define a second set of sub-wavelength surface features. As another example, an optical system may include a light unit and a light-transmissive optical component that defines the first set of sub-wavelength surface features and a multilayer coating that is disposed over the first set of sub-wavelength surface features and defines a second set of sub-wavelength surface features.

The disclosure provides an anti-reflective optical structure comprising a light-transmissive element formed from a semiconductor material, the light-transmissive element having a transmission surface defining a first sub-wavelength grating, a first layer formed from a first material and disposed onto at least a portion of the first sub-wavelength grating, the first layer together with the first sub-wavelength grating defining a first refractive index gradient and the first material having a refractive index less than a refractive index of the semiconductor material, and a second layer formed from a second material, disposed over the first layer, and defining a second sub-wavelength grating, the second sub-wavelength grating defining a second refractive index gradient and the second material having a refractive index that is less than the refractive index of the semiconductor material and greater than the refractive index of the first material.

The disclosure also provides a photonic integrated circuit comprising a substrate, a waveguide structure defining a transmission surface and comprising a cladding layer coupled to the substrate, a core at least partially surrounded by the cladding layer, having a refractive index greater than a refractive index of the cladding layer, and defining a first set of surface features along the transmission surface, and a coating comprising a first coating layer disposed over the first set of surface features and defining, in combination with the first set of surface features, a first refractive index gradient, and a second coating layer disposed over the first coating layer and defining a second set of surface features, the second set of surface features defining a second refractive index gradient.

The disclosure further provides an optical system comprising a light unit, a substrate, and a waveguide optically connected to the light unit, supported by the substrate, and comprising a cladding layer and a semiconductor layer disposed over the cladding layer and defining a first sub-wavelength structured surface along a transmission surface of the waveguide. The optical system further comprises a coating disposed over the transmission surface of the waveguide, the coating comprising a first coating layer extending into recesses of the first sub-wavelength structured surface and a second coating layer disposed over the first coating layer and defining a second sub-wavelength structured surface.

BRIEF DESCRIPTION OF THE DRAWINGS

The disclosure will be readily understood by the following detailed description in conjunction with the accompanying drawings, wherein like reference numerals designate like elements.

Figure 1:
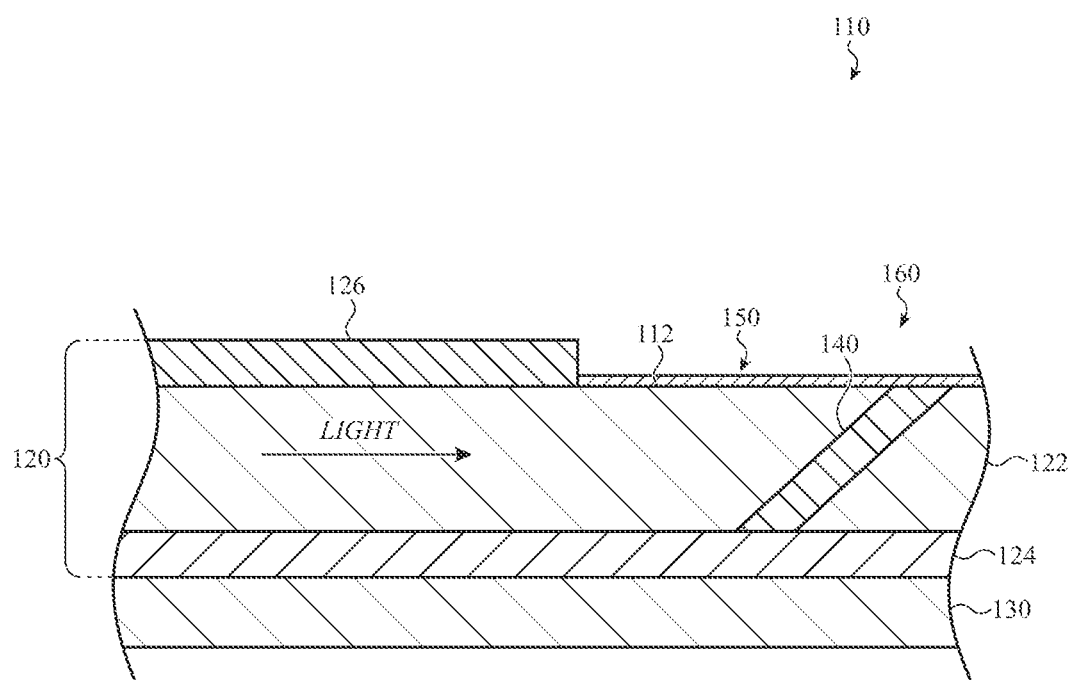
FIG. 1 shows a partial cross-sectional view of a photonic integrated circuit including an anti-reflective optical structure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The present disclosure relates to anti-reflective optical structures. The anti-reflective optical structures can be used to limit reflection of light from transmission surfaces of optical components. For example, an anti-reflective optical structure as described herein can reduce back reflection of light exiting the optical component and entering a medium having a lower refractive index. In some cases, the optical component is a waveguide and the transmission surface may be defined by the waveguide core.

An anti-reflective optical structure as described herein can reduce back-reflection from a transmission surface over a broad range of wavelengths, such as a target wavelength range spanning at least 500 nm. In some cases, the anti-reflective effect may be obtained over a target wavelength range spanning 1000 nm. As an example, the amount of back-reflection may be no greater than −20 dB, −25 dB, or −30 dB, with a lesser amount of back-reflection having a more negative dB value. The amount of back-reflection may be determined from the reflection coefficient R. In some cases, the amount of back-reflection may be associated with a target wavelength range (e.g., an averaged amount of back-reflection over the target wavelength range).

The anti-reflective optical structure may be partially defined by surface features along the transmission surface of the optical component. In some cases, the transmission surface defines a first set of sub-wavelength surface features. The first set of sub-wavelength surface features may define a sub-wavelength grating or another sub-wavelength structure along the transmission surface. In some examples, the first set of sub-wavelength surface features may have a dimension and/or a spacing that is less than 1 micrometer to facilitate use of the anti-reflective optical structure for infrared light. In some cases, the infrared light may include one or more wavelengths within a range from 1 micrometer to 3 micrometers. Therefore, in some cases a target wavelength range may span wavelengths from 1 micrometer to 3 micrometers.

The anti-reflective optical structure may also be partly defined by a coating disposed over the surface features along the transmission surface. In some cases, the coating is a multi-layer coating and an innermost layer of the multi-layer coating is disposed onto at least a portion of these surface features. For example, when the transmission surface defines a first set of grooves, an innermost layer of the multi-layer coating may extend into the grooves and along the groove walls. An outermost layer of the multi-layer coating may be disposed over a first coating, may define an interface with the medium (e.g., air), and may define a second set of surface features. The second set of surface features may be a second set of sub-wavelength surface features that define a sub-wavelength grating or another sub-wavelength structure. For example, the outermost layer of the multi-layer coating may define a second set of grooves. In some examples, the second set of sub-wavelength surface features may have a dimension and/or a spacing that is less than 1 micrometer to facilitate use of the anti-reflective optical structure for infrared light.

An anti-reflective optical structure as described herein may include a refractive index gradient. In some cases, the anti-reflective optical structure defines multiple refractive index gradients. In embodiments where the anti-reflective optical structure includes multiple sets of sub-wavelength features, each set of sub-wavelength features defines a corresponding refractive index gradient. For example, each of the first set of sub-wavelength surface features and the second set of sub-wavelength surface features discussed above may define a corresponding refractive index gradient that decreases in an outward direction, as described in more detail below. The first set of sub-wavelength surface features in combination with the first layer of the multi-layer coating may also define a refractive index gradient and this refractive index gradient in combination with the refractive index gradient defined by the second set of sub-wavelength features may collectively form an overall refractive index gradient of the anti-reflective optical structure.

The materials used to form the layers of the multi-layer coating may be selected to produce the desired refractive index gradient(s). For example, the first layer of the multi-layer coating may be formed from a material that has a refractive index less than a refractive index of the material defining the transmission surface of the optical component. The second layer of the multi-layer coating may be formed from a material that has a refractive index less than a refractive index of the material defining the transmission surface and greater than a refractive index of the material forming the first layer.

The present disclosure also relates to photonic integrated circuits and optical systems including anti-reflective optical structures. Specifically, an optical system may include one or more optical components such as a waveguide, lens, or the like, that transmits light through a transmission surface thereof having an anti-reflective optical structure. For example, the photonic integrated circuit may include an optical component that defines the first set of sub-wavelength surface features and a multilayer coating that is disposed over the first set of sub-wavelength surface features. As previously described, an outermost layer of the coating may define a second set of sub-wavelength surface features. As another example, an optical system may include a light unit and an optical component that defines the first set of sub-wavelength surface features and a multilayer coating that is disposed over the first set of sub-wavelength surface features and defines a second set of sub-wavelength surface features.

These and other embodiments are discussed below with reference to FIGS. 1-8 However, those skilled in the art will readily appreciate that the detailed description given herein with respect to these figures is for explanatory purposes only and should not be construed as limiting.

FIG. 1 illustrates a partial cross-sectional view of a photonic integrated circuit 110 including an anti-reflective optical structure 150. The anti-reflective optical structure 150 may define one or more refractive index gradients that can help reduce back-reflection of light, as described in more detail with respect to FIGS. 2A through 7.

In the example of FIG. 1, the photonic integrated circuit 110 includes a waveguide structure 120 provided on a substrate 130. The waveguide structure 120 is configured to carry light and emit light from a transmission surface 112 of the waveguide structure 120. For example, in the variation shown in FIG. 1, the photonic integrated circuit 110 also includes an outcoupler 140. In some cases, the waveguide structure 120 propagates light in a horizontal direction (as shown by the arrow) and the outcoupler 140 is a vertical output coupler (also referred to as a vertical outcoupler) that directs lights towards the transmission surface 112. The outcoupler 140 may define a surface (e.g., a metal, an oxide material, or the like) which reflects light towards the transmission surface 112. Light exiting the transmission surface 112 passes through the anti-reflective optical structure 150 and into an emergent medium 160 (e.g., air). The example of FIG. 1 is not limiting and in additional examples the outcoupler 140 is not required or may have a different orientation with respect to the waveguide, such as an edge coupler. Additionally, while the transmission surface 112 is shown in FIG. 1 as being flat, in other instances the transmission surface 112 may is curved, which may allow the transmission surface 112 to act as a lens to focus, collimate, or otherwise direct light emitted by the waveguide structure 120.

The waveguide structure 120 includes a core 122, and one or more cladding layers that provide optical confinement to the core 122. In the variation shown in FIG. 1, the waveguide structure 120 includes a lower cladding 124 positioned between the core 122 and the substrate 130, and an upper cladding 126 that surrounds the remaining sides of the core 122. The core 122 typically has a higher refractive index than the lower and upper claddings 124 and 126. In the example of FIG. 1, the core 122 defines the transmission surface 112 in an area not covered by the upper cladding 126. The lower cladding 124 extends along at least a portion of a lower surface of the core 122 and is coupled to the substrate 130. The upper cladding 126 extends along a portion of an upper surface of the core 122. In the example of FIG. 1, each of the core 122, the lower cladding 124, and the upper cladding 126 are in the form of layers (e.g., with the core 122 formed on the lower cladding 124 and the upper cladding 126 formed on the core 122). However, this example is not limiting and the waveguide structure may include other core and cladding configurations.

In some embodiments, the core 122 is formed of a material suitable for transporting infrared light. In some cases, the core 122 is formed from a semiconductor material. As examples, the semiconductor material may be a group IV semiconductor material such as silicon or a III-V type semiconductor material such as gallium arsenide or indium phosphide. As referred to herein, a semiconductor material such as silicon can include dopant-free or doped semiconductor compositions. In some embodiments, each of the lower cladding 124 and the upper cladding 126 is formed from a dielectric material. Suitable dielectric materials include, but are not limited to, oxide materials such as silicon oxide (e.g., silicon dioxide, $SiO_2$), nitride materials, or oxynitride materials. In other embodiments, the lower cladding 124 and/or the upper cladding 126 may be formed from a semiconductor material. In some instances when the core 122 is formed from silicon, the lower cladding 124 and the upper cladding 126 may be formed from silicon dioxide and the substrate 130 may be formed from silicon.

Figure 2A:
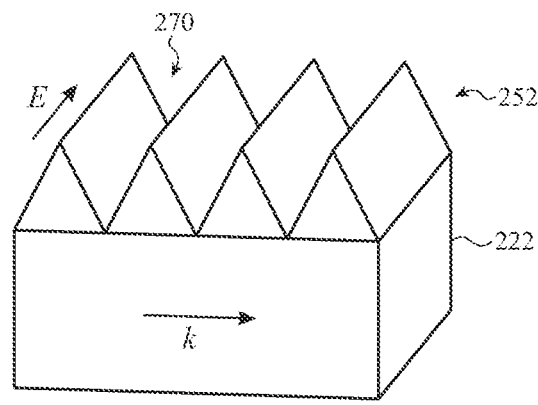
FIG. 2A shows a partial magnified view of an example sub-wavelength grating formed into an optical component.
Figure 2B:
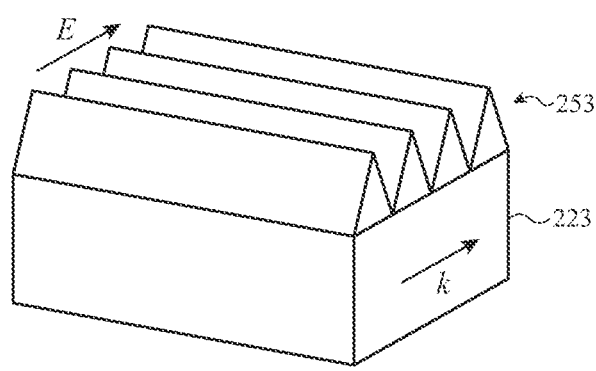
FIG. 2B shows a partial magnified view of another example sub-wavelength grating formed into an optical component.
Figure 3:
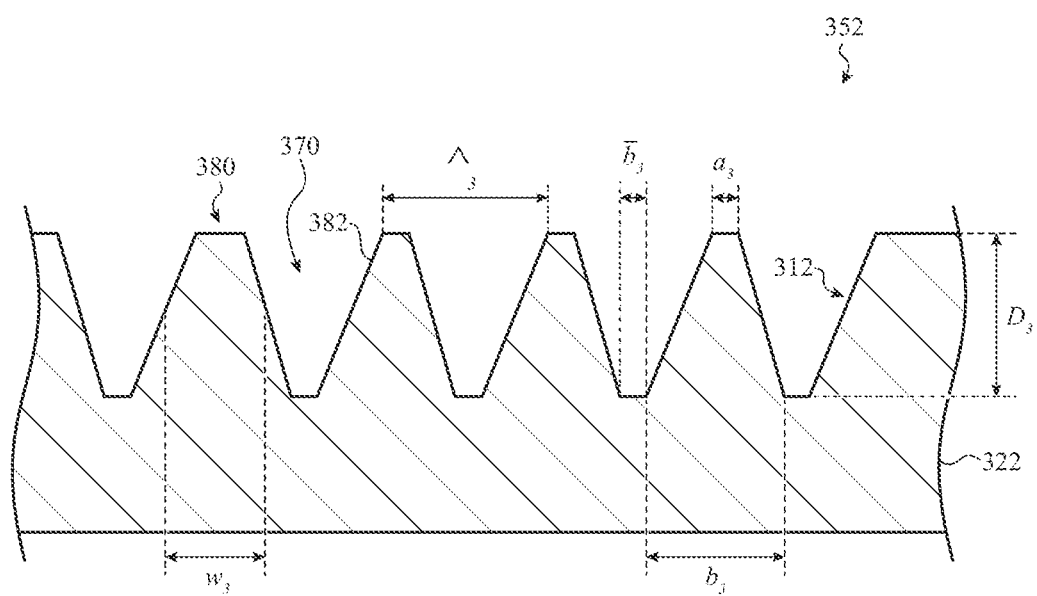
FIG. 3 shows a magnified cross-sectional view of an example of a sub-wavelength grating formed into an optical component.

In embodiments described herein, the transmission surface 112 defines a set of sub-wavelength surface features. The transmission surface 112 may therefore be referred to herein as a sub-wavelength structured surface. In some examples, the set of sub-wavelength surface features may have a dimension and/or a spacing that is less than 1 micrometer to facilitate use of the anti-reflective optical structure for infrared light. The set of sub-wavelength surface features may be configured to define a refractive index gradient. In some cases, the set of sub-wavelength surface features may define a sub-wavelength grating, as shown in the examples of FIGS. 2A-2B and 3. However, these examples are not limiting and in other examples sub-wavelength surface features may define other shapes suitable for producing a refractive index gradient, such as an array or randomly arranged set of cones, truncated cones, pyramids, truncated pyramids, or the like.

Figure 4:
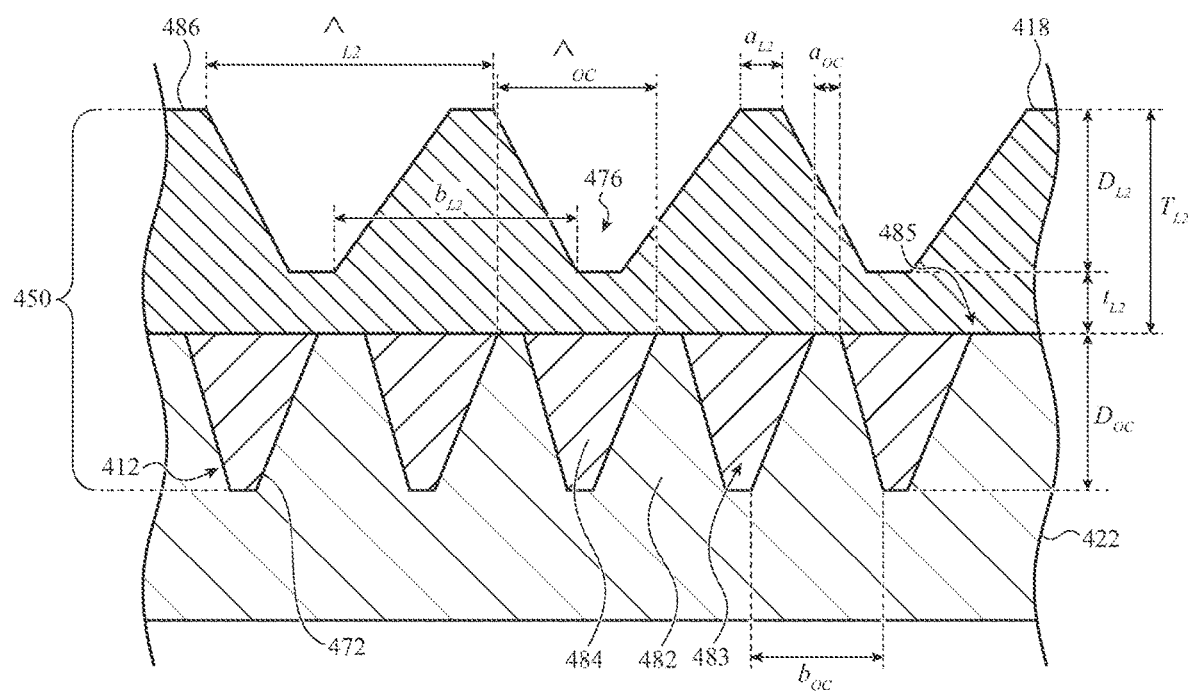
FIG. 4 shows an example of an anti-reflective optical structure extending partially into an optical component.

In some embodiments, the anti-reflective optical structure 150 includes the sub-wavelength surface features of the transmission surface 112 as well as at least one coating layer disposed over the sub-wavelength surface features. In some examples the anti-reflective optical structure 150 includes multiple coating layers, as shown in the example of FIG. 4. In additional examples, the anti-reflective optical structure 150 includes a single coating layer, as shown in the example of FIG. 6.

Figure 6:
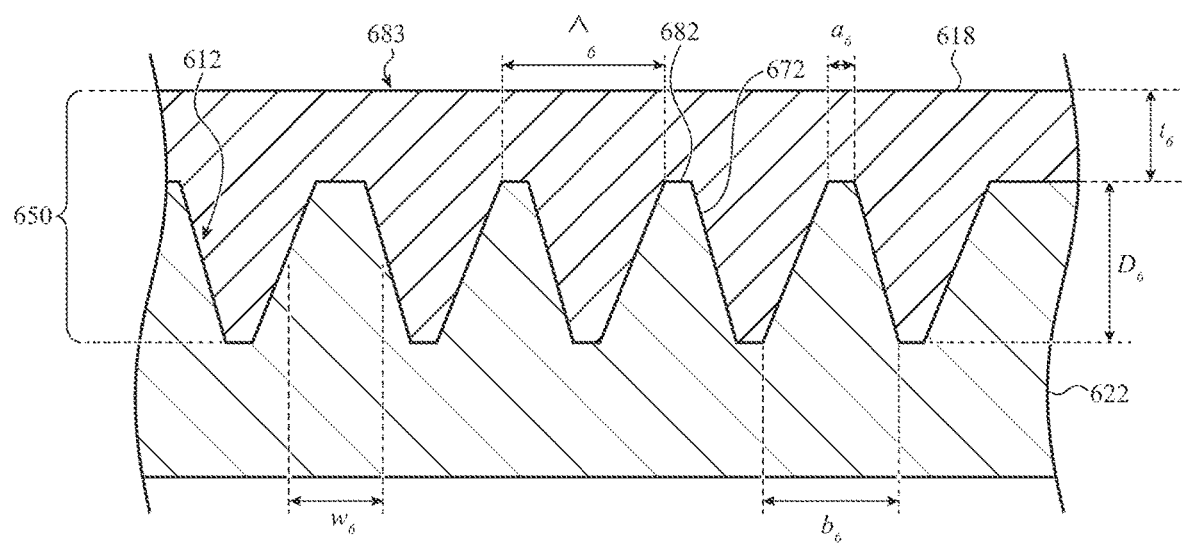
FIG. 6 shows another example of an anti-reflective optical structure extending partially into an optical component.

In some embodiments, the single coating layer or an innermost layer of a multi-layer coating at least partially fills recesses defined by the sub-wavelength surface features, as shown in the examples of FIGS. 4 and 6. This layer of the coating may be formed of a material having a refractive index less than a refractive index of the semiconductor material of the core 122 and may be formed of a dielectric material. Suitable dielectric materials include, but are not limited to, oxide materials such as silicon oxide (e.g., silicon dioxide, $SiO_2$), nitride materials, and oxynitride materials. In some cases, this layer of the coating may be formed from the same material as the lower and upper cladding layers 124 and 126. For example, the single or innermost layer may be formed from silicon dioxide when the core layer 122 is formed from silicon and the lower and upper cladding layers 124 and 126 are formed from silicon dioxide.

If the coating includes multiple layers, the outermost layer of the coating may be formed of a material having a refractive index less than a refractive index of the semiconductor material of the core 122 and greater than a refractive index of the innermost layer of the coating. In some cases, the outermost layer of the coating may be formed from a dielectric material. Suitable dielectric materials include, but are not limited to, oxide materials such as silicon oxide, nitride materials (e.g., a silicon nitride, $Si_xN_y$ which includes $Si_3N_4$), and oxynitride materials. For example, the outermost layer may be formed from a silicon nitride when the core layer 122 is formed from silicon and the lower and upper cladding layers 124 and 126 and the innermost layer are formed from a silicon oxide.

The example of FIG. 1 is not intended to limit the application of the anti-reflective optical structures described herein to waveguides. In additional examples, the anti-reflective optical structures described herein may be applied to other types of light-transmissive optical components, such as lenses, mirrors, prisms, diffractive optical elements, light emitting devices (e.g., Lasers and micro-LEDs), and light receiving devices (e.g., photodetectors, solar cells).

FIGS. 2A and 2B show partial magnified views of sub-wavelength gratings 252 and 253 formed into optical components 222 and 223. As previously discussed with respect to FIG. 1, the sub-wavelength gratings 252 and 253 may be formed into a transmission surface of a waveguide. As discussed in more detail with respect to FIG. 3, the sub-wavelength gratings 252 and 253 produce effective refractive index gradients that can help limit back reflection at the transmission surface. The description provided with respect to FIG. 3 is generally applicable herein and is not repeated here.

As shown in FIG. 2A, the sub-wavelength grating includes grooves 270 that extend generally perpendicular to the grating vector k and generally parallel to each other. The grooves 270 also extend into the optical component 222. As illustrated in FIGS. 2A and 2B, the grating vector k may have different orientations with respect to a direction of the electric field E of light passing through the grating. In some implementations, the grating vector may have an orientation that is parallel or perpendicular with respect to the direction of the electric field E. In the example of FIG. 2A, the grating vector k is perpendicular to the direction of the electric field E and in the example of FIG. 2B the grating vector k is parallel to the direction of the electric field E.

FIG. 3 shows a magnified cross-sectional view of an example of a sub-wavelength grating 352 formed into an optical component 322. The view of FIG. 3 is so that the grating vector k is included in the plane of the cross-section. As previously discussed with respect to FIG. 1, the sub-wavelength grating 352 may be formed into a transmission surface of a waveguide to produce a sub-wavelength structured transmission surface 312. As shown in FIG. 3, the grating includes a plurality of grooves 370 that have a spacing $\Lambda_3$ at the top of the grooves, which may also be referred to herein as a pitch. The spacing $\Lambda_3$ may be less than the smallest wavelength of light to be transported through the optical component and in some cases may be less than or equal to the smallest wavelength of light to be passed through the optical component divided by the index of refraction of the optical component 322. As shown in the example of FIG. 3, the grooves define a width $\overline{b}_3$ at the bottom of the groove and have a depth $D_3$. The grooves 370 are narrower at the bottom of the groove than at the top of the groove.

As shown in FIG. 3, the grooves may have a depth $D_3$ about equal to the spacing $\Lambda 3$. However, this example is not limiting and in additional examples the depth $D_3$ may be greater than or less than the spacing $\Lambda_3$. The grooves may be formed using an etching process, which may be a lithographic etching process. As shown in FIG. 3, the grooves 370 define a cross-sectional profile that has the shape of a truncated triangle. However, when $\overline{b}_3$ is zero the profile becomes triangular.

As shown in FIG. 3, the remaining portions of the optical component between the grooves 370 define ridges 380. The ridges 380 also define a cross-sectional profile that has the shape of a truncated triangle. Due to the general increase in the width of the ridges 380 with increasing depth into the groove, the effective refractive index of the sub-wavelength grating 352 increases with increasing depth into the groove (in a Z direction). Therefore, the effective refractive index of the sub-wavelength grating 352 decreases in a direction from the base to the tops of the ridges 380. The ridges 380 have a cross-section profile that includes a base width $b_3$ and a top width $a_3$. The width of $w_3$ of a given ridge 380 varies with height and ranges between $b_3$ and $a_3$. The base width $b_3$ is equal to the difference of the spacing $\Lambda_3$ and the width $\overline{b}_3$.

The top width $a_3$ is typically small relative to the base width $b_3$. When $a_3$ is zero the profile becomes triangular. The ridges 380 also define walls 382 of the grooves 370, also referred to herein as groove walls.

In some examples, the spacing $\Lambda_3$ may be less than 1 micrometer, less than 500 nm, less than 400 nm, or less than 300 nm. As additional examples, the spacing $\Lambda_3$ may be in the range from 100 nm to 500 nm or from 200 nm to 400 nm. In cases where the spacing is less than 1 micrometer, a surface such as the surface 312 may be referred to herein as a nanostructured surface. The width $\overline{b}_3$ is less than the spacing $\Lambda_3$ and in some cases may be less than or equal to 25 nm or less than or equal to 10 nm. The depth $D_3$ of the grooves may be greater than the spacing $\Lambda_3$. As a reference example, when the sub-wavelength structured transmission surface 312 provides all of the anti-reflective effect of the optical structure, the depth $D_3$ may be in the range from 1 micrometer to 5 micrometers or 2 micrometers to 10 micrometers and the top width $a_3$ in some cases may be less than or equal to 25 nm or less than or equal to 10 nm. These values may be applicable to examples where the optical component is formed from silicon or another material having a similar index of refraction. In some instances, some of these grating dimensions may be difficult to achieve using lithographic etching techniques. The anti-reflective optical structures described below allow some of these dimensional constraints to be relaxed and may therefore be easier to manufacture.

Figure 5:
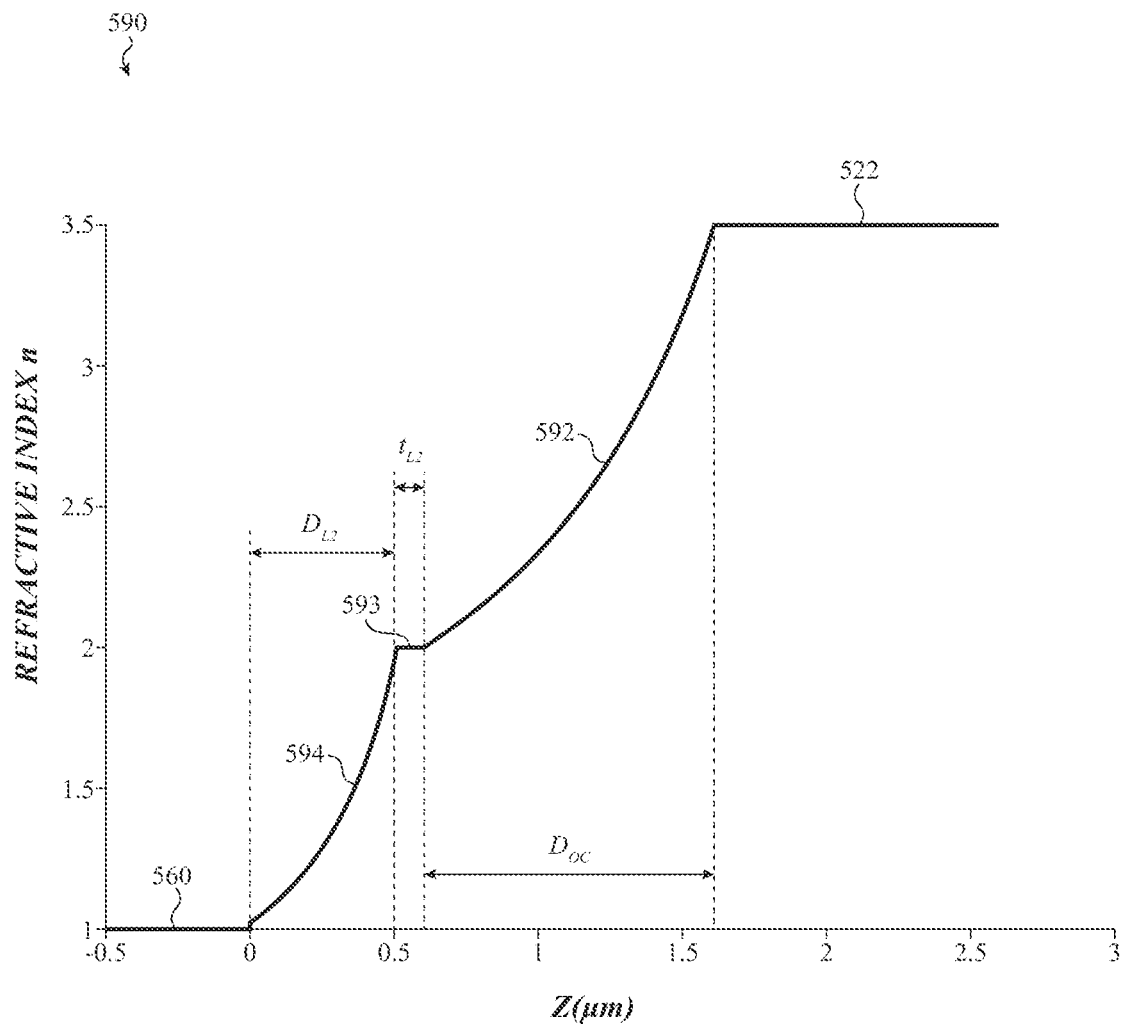
FIG. 5 shows an example of a refractive index profile of an anti-reflective optical structure.

FIG. 4 shows an example of an anti-reflective optical structure 450 extending partially into an optical component 422. The anti-reflective optical structure 450 defines effective refractive index gradients that can help limit back reflection through the anti-reflective optical structure. An example of the variation in effective refractive index with distance from the outer surface 418 of the anti-reflective optical structure 450 is shown in FIG. 5. The optical component 422 may serve as a substrate for at least some elements of the anti-reflective optical structure 450.

The anti-reflective optical structure 450 includes a sub-wavelength structured transmission surface 412. The anti-reflective optical structure also includes a coating layer 483 and a coating layer 485 disposed over the sub-wavelength structured transmission surface 412. In the example of FIG. 4, the coating layer 483 and the coating layer 485 together make up a multi-layer coating. The coating layer 483 may also be referred to herein as a first coating layer and the coating layer 485 may also be referred to herein as a second coating layer. However, the example of FIG. 4 is not limiting and in additional examples one or more additional coatings may be provided, such as an additional coating between the innermost and outmost coating layers. These additional coating layers may help to provide a desired refractive index profile for the anti-reflective optical structure.

As shown in FIG. 4, the sub-wavelength structured transmission surface 412 includes sub-wavelength grooves 472 and ridges 482. The ridges 482 separate the grooves 472 and have flat tops in this example. The grooves 472 increase in width in a direction from the optical component 422 to the second coating layer 485. When the optical component 422 is formed on a substrate, the grooves 472 may also increase in width in a direction from this substrate to the second coating layer 485. The sub-wavelength structured transmission surface 412 defines a sub-wavelength grating.

The spacing $\Lambda_{OC}$ and the width $b_{OC}$ of the ridges 482 may be generally similar to the parameters $\Lambda_3$ and $b_3$ previously discussed with respect to FIG. 3. However, suitable values for the depth $D_{OC}$ may be less than previously described with respect to the sub-wavelength structured transmission surface 312 and may range from 500 nm to 2 micrometers or from 1 micrometer to 3 micrometers. When the depth $D_{OC}$ of the nanostructured surface 412 is less than the depth $D_3$ of the nanostructured surface 312, the process requirements for making the nanostructured surface 412 can be less demanding than those for making the sub-wavelength structured transmission surface 312. Suitable values for the width $a_{OC}$ may be larger than the values for the sub-wavelength structured transmission surface 312 and may be selected to produce a desired effective refractive index at the interface between the coating layer 485, the tops of the ridges 482 and the coating layer 483. In some examples, the value $a_{OC}$ may be in a range from 50 nm to 300 nm. For example, these values may be applicable to examples where the optical component is formed from silicon or another material having a similar index of refraction and the coating layer 483 is formed from silicon dioxide or another material having a similar index of refraction. In some instances, it may be desirable to set the parameters of the spacing $\Lambda_{OC}$, the width $b_{OC}$, the depth $D_{OC}$, and the width $a_{OC}$ to produce an adiabatic transition of the refractive index that reduces the coupling of light into different modes as it passes through the sub-wavelength structured transmission surface 412.

The coating layer 483 is disposed between the ridges 482 and onto the surfaces of ridges that define the walls of the grooves 472. In the example of FIG. 4, the coating layer 483 fills the grooves 472 and therefore also defines a set of sub-wavelength features 484. In other examples, the coating may fill 90% or more of the grooves 472. The coating layer 483 may be formed of a material having a refractive index less than a refractive index of the optical component 422, as previously discussed with respect to FIG. 1. The coating layer 483 and the ridges 482 may therefore define an effective refractive index gradient that decreases from the bottom to the top of the grooves 472. In other words, the coating layer 483 and the sub-wavelength structured transmission surface 412 together define a first refractive index gradient that decreases in a direction from the optical component 422 to the coating layer 485. When the optical component 422 is formed on a substrate, the first refractive index gradient may also decrease in a direction from this substrate to the second coating layer 485. However, in the example of FIG. 4, the geometry of the ridges (e.g., the values $a_{oc}$ and $\Lambda_{OC}$) is selected so that the effective refractive index is approximately equal to the refractive index of the material of the coating layer 485 at the interface between the ridges 482, the coating layer 483, and the coating layer 485. An example of the variation in effective refractive index in this portion of the anti-reflective optical structure is shown to the right in FIG. 5. Suitable materials for the coating layer 483 are similar to the materials for the innermost coating layer previously described with respect to FIG. 1 and that description is not repeated here.

As shown in FIG. 4, the coating layer 485 is disposed onto the top of the ridges 482 and onto the coating layer 483. The coating layer 485 may be formed of a material having a refractive index less than a refractive index of the optical component 422 and greater than a refractive index of the coating layer 483. The coating layer 485 defines a second set of sub-wavelength surface features, shown as grooves 476 and ridges 486 and therefore defines a second sub-wavelength structured surface, with the sub-wavelength structured transmission surface 412 defining the first sub-wavelength structured surface. The coating layer 485 therefore defines an effective refractive index gradient that decreases from the bottom to the top of the grooves 476. In other words, the coating layer 485 defines a second sub-wavelength structured surface that defines a second refractive index gradient that decreases in a direction from the optical component 422 to the coating layer 485. When the optical component 422 is formed on a substrate, the second refractive index gradient may also decrease in a direction from this substrate to the second coating layer 485. An example of the variation in effective refractive index in this portion of the anti-reflective optical structure is shown to the left in FIG. 5. The coating layer 485 may have a density of at least 90% in some embodiments.

Since the depth $D_{L2}$ of the grooves 476 is less than the thickness 112 of the coating layer 485, the coating layer 485 also defines a region that does not include grooves or ridges and thus may be referred to herein as a non-textured region. In the example of FIG. 4, this region of the coating layer 485 has a thickness $t_{L2}$ and is positioned between the bottoms of the grooves 476 and the top of the coating layer 483 and the ridges 482. Because this region is not textured and is formed only of the material of the coating layer 485, it may have a constant refractive index. The thickness $t_{L2}$ of this region of the coating layer 485 may be less than either or both of depths $D_{OC}$ and $D_{L2}$. For example, the thickness may be in the range from 50 nm to 500 nm or from 100 nm to 200 nm. An example of this constant refractive index region is also shown in FIG. 5. Suitable materials for the coating layer 485 are similar to those previously discussed with respect to the outermost layer FIG. 1 and that description is not repeated here.

The spacing $\Lambda_{L2}$ may be less than the smallest wavelength of light to be transported through the optical component and in some cases may be less than or equal to the smallest wavelength of light to be transported through the optical component divided by the index of refraction of the coating layer 485. In some cases, the spacing $\Lambda_{L2}$ may be greater than the spacing $\Lambda_{OC}$. The depth $D_{L2}$ of the grooves 476 may be similar to the depth $D_{OC}$ of the grooves 472. The width $a_{L2}$ of the ridges 486 may be similar to the width $a_3$ previously discussed with respect to FIG. 3 and that description is not repeated here. For example, these values may be applicable to examples where the coating layer is formed from silicon nitride or another material having a similar index of refraction. In some instances, it may be desirable to set the parameters of the spacing $\Lambda_{L2}$, the width $b_{L2}$, the depth $D_{L2}$, and the width $a_{L2}$ to produce an adiabatic transition of the refractive index that reduces the coupling of light into different modes as it passes through the sub-wavelength structured surface defined by the grooves 476 and the ridges 486.

FIG. 5 shows an example of a refractive index profile of an anti-reflective optical structure. The refractive index profile 590 may be produced by an anti-reflective optical structure similar to the anti-reflective optical structure 450 of FIG. 4, as discussed in more detail below. The refractive index profile 590 provides a transition between the higher refractive index of the optical component and the lower refractive index of the emergent medium. In the example of FIG. 5, the refractive index profile 590 includes a first refractive index gradient 592, a reflective index plateau 593, and a second refractive index gradient 594. The first refractive index gradient 592 may have a lower bound that is greater than or equal to the refractive index of the reflective index plateau 593. The plateau 522 indicates the refractive index of the optical component, which in some cases may be a waveguide core. The plateau 560 indicates the refractive index of the emergent medium. The refractive index values n and the distance values Z (depth from the top of the anti-reflective optical structure) shown in FIG. 5 are exemplary rather than limiting and can vary depending on the materials of the optical component and layer(s) of the anti-reflective optical structure, the dimensions of the sub-wavelength features, the wavelength of light, and the like.

In embodiments, the first and second refractive index gradients 592 and 594 and the refractive index plateau 593 are configured to provide a sufficiently gradual refractive index transition to limit reflection from the anti-reflective optical structure. For example, back reflection of light exiting the optical component through the anti-reflective optical structure can be no greater than −20 dB, −25 dB, or −30 dB over a target wavelength range (e.g., an averaged amount of back-reflection over the target wavelength range). The anti-reflective optical structure of FIGS. 4 and 5 can also reduce reflection over a relatively large bandwidth, such as 500 nm or 1000 nm.

As previously mentioned, the refractive index profile 590 may be produced by an anti-reflective optical structure similar to the anti-reflective optical structure 450 of FIG. 4. For example, the first refractive index gradient 592 may be produced by a sub-wavelength structured transmission surface of the optical component and a first coating layer that fills recesses defined by this sub-wavelength structured transmission surface. The plateau 593 may be produced by a region of a second coating layer that is not textured and the second refractive index gradient 594 may be produced by another region of the second coating layer that defines another sub-wavelength transmission surface at an outer surface of the anti-reflective optical structure. The change in the distance value Z for the first refractive index gradient 592 may correspond to $D_{OC}$, the change in the distance value Z for the plateau 593 may correspond to $t_{L2}$, and the change in the distance value Z for the second refractive index gradient 594 may correspond to $D_{L2}$.

Figure 7:
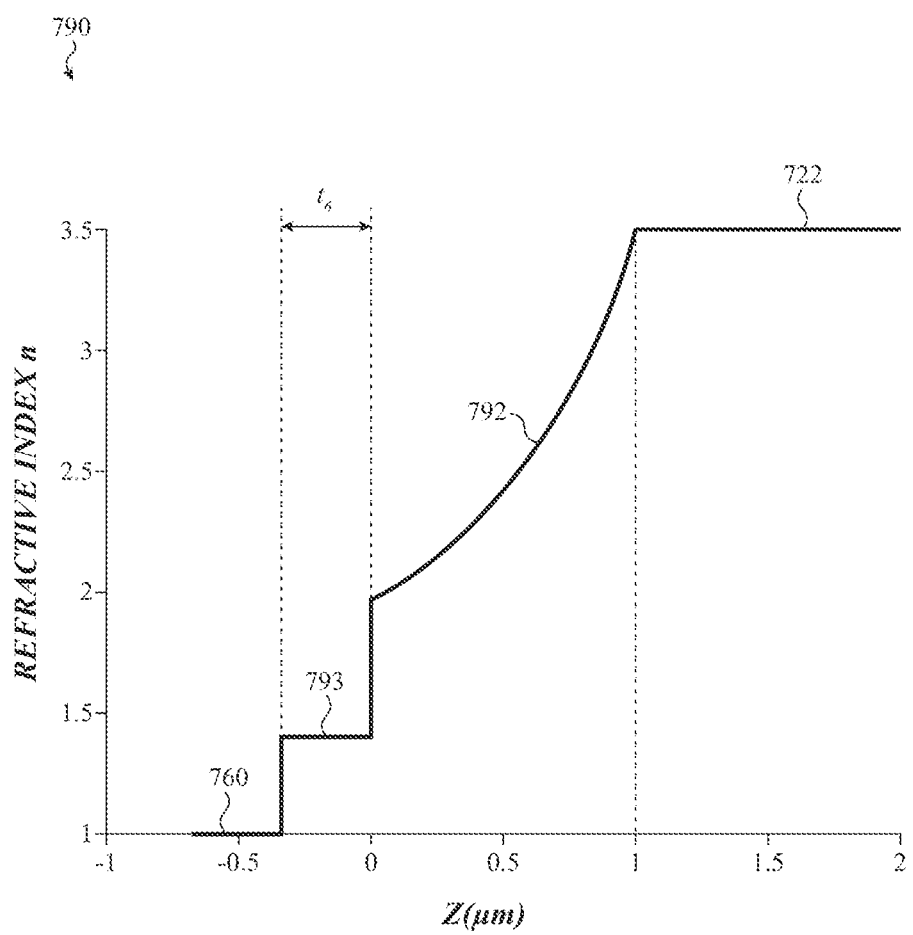
FIG. 7 shows another example of a refractive index profile of an anti-reflective optical structure

FIG. 6 shows another example of an anti-reflective optical structure extending partially into an optical component 622. The anti-reflective optical structure 650 defines an effective refractive index gradient that can help limit back reflection at the transmission surface. An example of the variation in effective refractive index with distance from the outer surface 618 of the anti-reflective optical structure 650 is shown in FIG. 7.

The anti-reflective optical structure 650 includes a sub-wavelength structured transmission surface 612. The anti-reflective optical structure also includes a coating 683 disposed over the sub-wavelength structured transmission surface 612. The coating 683 may be formed of a single layer and may have a homogeneous dielectric constant. Suitable materials for the coating 683 are similar to the materials for the single coating layer previously described with respect to the example of FIG. 1 and that description is not repeated here. However, in other examples the coating 683 may include additional layers in order to enhance the anti-reflective effect. In further examples, the coating 683 may define a refractive index gradient through varying the density (e.g., porosity) or phase through the thickness of the coating.

As shown in FIG. 6, the sub-wavelength structured transmission surface 612 includes sub-wavelength grooves 672 and ridges 682 of the optical component 622. The sub-wavelength structured transmission surface 612 defines a sub-wavelength grating. The spacing $\Lambda_6$ and the width $b_6$, of the ridges 682 may be generally similar to the values for $\Lambda_3$ and $b_3$ previously discussed with respect to FIG. 3. However, suitable values for the depth $D_6$ may be less than those previously described with respect to the depth $D_3$ of the sub-wavelength structured transmission surface 312. The depth $D_6$ may range from 1 micrometer to 4 micrometers in some examples. When the depth $D_6$ of the nanostructured surface 612 is less than the depth $D_3$ of the nanostructured surface 312, the process requirements for making the nanostructured surface 612 can be less demanding than those for making the sub-wavelength structured transmission surface 312. Suitable values for $a_6$ may be larger than the values for $a_3$ of the sub-wavelength structured transmission surface 312 and may be selected to produce a desired effective refractive index at the tops of the ridges 682 (shown as substantially flat in this example). For example, the effective refractive index at the tops of the ridges may be intermediate between the refractive indices of the materials from which the optical component 622 and the coating 683 are formed. In some examples, the value $a_6$ may be in a range from 50 nm to 300 nm or from 50 nm to 200 nm. For example, these values may be applicable to examples where the optical component is formed from silicon or another material having a similar index of refraction. In some instances, it may be desirable to set the parameters of the spacing $\Lambda_6$, the width $b_6$, the depth $D_6$, and the width $a_6$ to produce an adiabatic transition of the refractive index that reduces the coupling of light into different modes as it passes through the sub-wavelength structured transmission surface 612. The width of $w_6$ of a given ridge 682 varies with height and ranges between $b_6$ and $a_6$.

A lower region of the coating 683 is disposed between the ridges 682 and onto surfaces of the ridges that define the grooves 672. In the example of FIG. 6, the lower region of the coating 683 fills the grooves 672 and therefore also defines a set of sub-wavelength features. In other examples, the coating 683 fills 90% or more of the grooves. The coating 683 may be formed of a material having a refractive index less than a refractive index of the optical component 622, as previously discussed with respect to FIG. 1. This region of the coating 683 and the ridges 682 may therefore define an effective refractive index gradient that decreases from the bottom to the top of the grooves 672. In other words, this region of the coating 683 and the nanostructured surface 612 may define an effective refractive index gradient that together define a refractive index gradient that decreases in a direction from the optical component 622 (or an underlying substrate) to an exterior surface of the coating layer 683.

An upper region of the coating layer does not define sub-wavelength features and extends from the height of the tops of the ridges 682 to an outer surface 618 of the coating 683. This upper region of the coating layer has a thickness $t_6$. In some examples, the thickness $t_6$ is about equal to a target wavelength of light divided by the product of four times the index of refraction of the material from which the coating 683 is formed. In some cases, the thickness $t_6$ is in a range from 150 nm to 600 nm. In some examples, the target wavelength may be a wavelength of light that is transported through the optical component while in other examples where multiple wavelengths within a target wavelength range are used in the optical system the target wavelength may be selected to balance performance across these multiple wavelengths.

In embodiments, the anti-reflective optical structure 650 limits reflection both by providing a refractive index gradient and by providing a quarter-wavelength thickness to the upper region of the coating 683. The anti-reflective optical structure of FIG. 6 can also reduce reflection over a relatively large bandwidth, such as 500 nm or 1000 nm, however, the amount of reflection reduction is greater for wavelengths of light that are about four times the thickness of the coating. In some examples, the reflection of light exiting the optical component through the anti-reflective optical structure can be no greater than −20 dB or −25 dB for these wavelengths.

FIG. 7 shows another example of a refractive index profile of an anti-reflective optical structure. As discussed in more detail below, the refractive index profile 790 may be produced by an anti-reflective optical structure similar to the anti-reflective optical structure 650 of FIG. 6. The refractive index profile 790 provides a transition between the higher refractive index of the optical component and the lower refractive index of the emergent medium. In the example of FIG. 7, the refractive index profile 790 includes a refractive index gradient 792 and a reflective index plateau 793. The plateau 722 indicates the refractive index of the optical component, which in some cases may be a waveguide core. The plateau 760 indicates the refractive index of the emergent medium. In the example of FIG. 7, the distance value Z is measured from the bottom of the plateau, rather than the top of the anti-reflective optical structure. The refractive index values n and the distance values Z shown in FIG. 7 are exemplary rather than limiting and can vary depending on the materials of the optical component and layer(s) of the anti-reflective optical structure, the dimensions of the sub-wavelength features, the wavelength of light, and the like.

As previously mentioned, the refractive index profile 790 may be produced by an anti-reflective optical structure similar to the anti-reflective optical structure 650 of FIG. 6. For example, the refractive index gradient 792 may be produced by a sub-wavelength structured transmission surface of the optical component and a first coating layer that fills recesses defined by this sub-wavelength structured transmission surface. The plateau 793 may be produced by a region of a second coating layer that is not textured. The change in the distance value Z for the refractive index gradient 792 may correspond to $D_6$ (see FIG. 6) and the change in the distance value Z for the plateau 793 may correspond to $t_6$.

Figure 8:
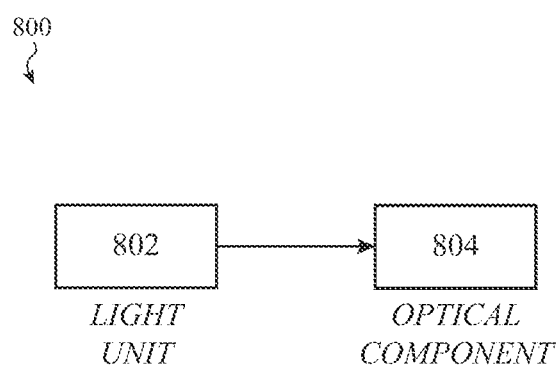
FIG. 8 shows a block diagram of an optical system.

FIG. 8 shows a block diagram of an optical system. The optical system 800 includes a light unit 802 and an optical component 804 optically coupled to the light unit 802. In embodiments, the optical component 804 includes an anti-reflective optical structure as described herein. In some embodiments, the light unit 802 and the optical component 804 may be included in a single photonic integrated circuit. The optical system 800 may also include additional components for routing light within the optical system. For example, the optical system may also include one or more components such as power splitters, power combiners, phase shifters, optical switches, polarizers, and the like.

The light unit 802 includes one or more light sources. In some cases, the light unit 802 includes a set of light sources. In embodiments, each of the light sources is selectively operable to emit light at one or more particular wavelengths across a target wavelength range as discussed above. Each light source may be any component capable of generating light at one or more wavelengths within the target wavelength range, such as a light-emitting diode or a laser. A laser may include a semiconductor laser, such as a laser diode (e.g., a distributed Bragg reflector laser, a distributed feedback laser, an external cavity laser), a quantum cascade laser, or the like. A given light source may be single-frequency (fixed wavelength) or may be tunable to selectively generate one of multiple wavelengths (i.e., the light source may be controlled to output different wavelengths at different times).

In some cases, the light unit 802 is configured to selectively generate multiple different wavelengths of light within a target wavelength range. Depending on the application, the light unit does not necessarily need to generate the entire target wavelength range but instead may be configured to generate a discrete number or set of wavelengths within the target wavelength range. The light unit may be able to generate multiple wavelengths in the target wavelength range simultaneously or may only be used to generate one wavelength at a time (and thus may generate different wavelengths in the target wavelength range at different times).

In embodiments, the light-transmissive component 804 includes a light-transmissive optical component and an anti-reflective optical structure as described herein. In some cases, the light-transmissive component may be a waveguide that is optically connected to the light unit 802. The anti-reflective optical structure may extend partially into a core of the waveguide as shown in the examples of FIG. 1. The optical system 800 may also include a substrate for supporting the waveguide or another type of light transmissive component.

As used herein, the terms "about," "approximately," "substantially," "similar," and the like are used to account for relatively small variations, such as a variation of +/−5%. In addition, use of the term "about" in reference to the endpoint of a range may signify a variation of +/−5% of the endpoint value. In addition, disclosure of a range in which at least one endpoint is described as being "about" a specified value includes disclosure of the range in which the endpoint is equal to the specified value.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An anti-reflective optical structure comprising:
   a light-transmissive element formed from a semiconductor material, the light-transmissive element having a transmission surface defining a first sub-wavelength grating;
   a first layer formed from a first material and disposed onto at least a portion of the first sub-wavelength grating, the first layer together with the first sub-wavelength grating defining a first refractive index gradient and the first material having a refractive index less than a refractive index of the semiconductor material; and
   a second layer formed from a second material, disposed over the first layer, and defining a second sub-wavelength grating, the second sub-wavelength grating defining a second refractive index gradient and the second material having a refractive index that is less than the refractive index of the semiconductor material and greater than the refractive index of the first material.

2. The anti-reflective optical structure of claim 1, wherein: the first sub-wavelength grating comprises a first set of grooves having a first spacing; and
   the second sub-wavelength grating comprises a second set of grooves having a second spacing, different than the first spacing.

3. The anti-reflective optical structure of claim 2, wherein each groove of the first set of grooves is narrower at a bottom of the groove than at a top of the groove.

4. The anti-reflective optical structure of claim 2, wherein:
   a depth of the second set of grooves is less than a thickness of the second layer; and
   the second layer further defines a region of constant refractive index between the first and the second sub-wavelength gratings.

5. The anti-reflective optical structure of claim 2, wherein:
   the second spacing is greater than the first spacing; and
   each of the first spacing and the second spacing is less than one micrometer.

6. The anti-reflective optical structure of claim 1, wherein the first refractive index gradient has a lower bound that is greater than or equal to the refractive index of the second material.

7. The anti-reflective optical structure of claim 1, wherein:
   the semiconductor material is silicon;
   the first material is a silicon oxide; and
   the second material is a silicon nitride.

8. A photonic integrated circuit comprising:
   a substrate;
   a waveguide structure defining a transmission surface and comprising:
      a cladding layer coupled to the substrate; and
      a core at least partially surrounded by the cladding layer, having a refractive index greater than a refractive index of the cladding layer, and defining a first set of surface features along the transmission surface; and
   a coating comprising:
      a first coating layer disposed over the first set of surface features and defining, in combination with the first set of surface features, a first refractive index gradient; and
      a second coating layer disposed over the first coating layer and defining a second set of surface features, the second set of surface features defining a second refractive index gradient.

9. The photonic integrated circuit of claim 8, wherein:
   the first set of surface features defines a first sub-wavelength structured surface for light having a wavelength greater than or equal to 900 nm; and
   the second set of surface features defines a second sub-wavelength structured surface for the light.

10. The photonic integrated circuit of claim 8 wherein:
    the core is formed of a semiconductor material; and
    the first coating layer is formed of a dielectric material.

11. The photonic integrated circuit of claim 10, wherein each of the cladding layer and the first coating layer are formed of the dielectric material.

12. The photonic integrated circuit of claim 11, wherein:
    the dielectric material is a silicon oxide; and
    the semiconductor material is silicon.

13. The photonic integrated circuit of claim 8, wherein:
    the cladding layer is a first cladding layer extending along a first portion of a lower surface of the core;
    the transmission surface is positioned on a first portion of an upper surface of the core; and
    the waveguide structure further comprises a second cladding layer extending along a second portion of the upper surface of the core.

14. The photonic integrated circuit of claim 13, further comprising a vertical outcoupler optically connected to the core and configured to direct light through the transmission surface.

15. An optical system comprising:
- a light unit;
- a substrate;
- a waveguide optically connected to the light unit, supported by the substrate, and comprising:
  - a cladding layer; and
  - a semiconductor layer disposed over the cladding layer and defining a first sub-wavelength structured surface along a transmission surface of the waveguide; and
- a coating disposed over the transmission surface of the waveguide, the coating comprising:
  - a first coating layer extending into recesses of the first sub-wavelength structured surface; and
  - a second coating layer disposed over the first coating layer and defining a second sub-wavelength structured surface.

16. The optical system of claim 15, wherein:
the first coating layer and the first sub-wavelength structured surface together define a first refractive index gradient that decreases in a direction from the substrate to the second coating layer; and
the second sub-wavelength structured surface defines a second refractive index gradient that decreases in the direction from the substrate to the second coating layer.

17. The optical system of claim 15, wherein the light unit is configured to generate multiple wavelengths of light, each wavelength of the multiple wavelengths exceeding 1 micrometer.

18. The optical system of claim 15, wherein the recesses of the first sub-wavelength structured surface are grooves that increase in width in a direction from the substrate to the second coating layer.

19. The optical system of claim 15, wherein:
the semiconductor layer is formed of silicon;
the first coating layer is formed of a first dielectric material having a refractive index less than a refractive index of the silicon; and
the second coating layer is formed of a second dielectric material having a refractive index greater than the refractive index of the first dielectric material and less than the refractive index of the silicon.

20. The optical system of claim 15, wherein the light unit is provided on the substrate.

* * * * *